Feb. 10, 1931. R. F. KOHR 1,792,225
BRAKE
Filed April 4, 1928 2 Sheets-Sheet 1

INVENTOR.
Robert F. Kohr
BY P. W. Pomeroy
ATTORNEY

Feb 10, 1931. R. F. KOHR 1,792,225
BRAKE
Filed April 4, 1928 2 Sheets-Sheet 2

INVENTOR.
Robert F Kohr
BY R. W. Pomeroy
ATTORNEY

Patented Feb. 10, 1931

1,792,225

UNITED STATES PATENT OFFICE

ROBERT F. KOHR, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed April 4, 1928. Serial No. 267,427.

This invention relates to vehicle brakes and particularly to the operating means therefor, the principal object being to provide a vehicle brake of the internal-expanding type with operating means for the brake element which compensates for uneven wear of the brake element.

Another object is to provide a vehicle brake of the internal-expanding type with means which permits free expanding action of the operating cam.

Another object is to provide a vehicle brake of the internal-expanding type with an operating cam which is free to move with the brake element as well as to rotate during expansion of the brake element.

A further object is to provide a vehicle brake of the internal-expanding type with a rotatable brake cam positioned between the ends of the brake element, and a resilient arm which rotatably supports the brake cam shaft whereby the cam is free to move to compensate for wear of the ends of the brake element and which is free to return to its normal position independently of the brake element.

These being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a section through a vehicle brake taken just inside the head of the brake drum showing the brake shoes and operating mechanism in elevation.

Figures 1, 2, 3, 4:
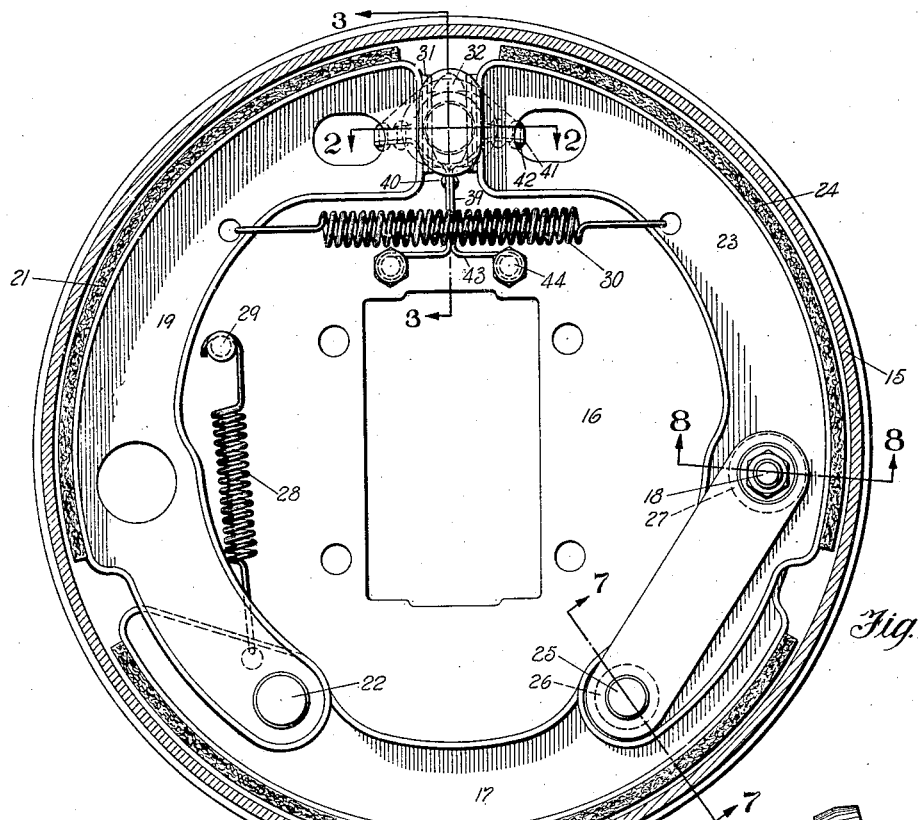
Figure 2 is an enlarged section taken on the line 2—2 of Figure 1 showing the cam support in detail.
Figure 3 is an enlarged section taken on the line 3—3 of Figure 1.
Figure 4 is a partial rear elevation of the brake looking toward the rear side of the backing plate to show the opening therein which permits movement of the brake cam and shaft.
Figure 9:
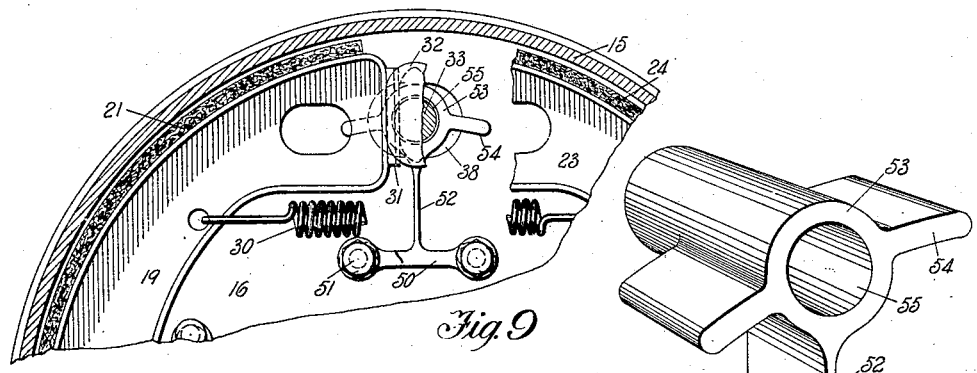
Figure 9 is a fragmentary front elevation of a brake showing a modified form of brake cam support.

Referring to the accompanying drawings in which like numerals refer to like parts throughout the several views, the brake shown for illustration in which the present invention is embodied comprises a brake drum 15 adjacent to which is a dust cover or backing plate 16. Within the drum 15 is the friction element comprising a secondary shoe 17 having its arcuate face covered with friction material 20 as shown in Figure 1 and having one end thereof pivotally anchored to a pin 18 secured to the backing plate 16; a primary shoe 19 having its arcuate face covered with friction material 21 and having a bifurcated end which telescopes the free end of the secondary shoe 17 and which is pivotally anchored by an articulating pin 22 carried by the free end of the secondary shoe 17; and a reverse shoe 23 having its arcuate face covered with friction material 24 and having one end pivotally anchored on a pin 25 secured to the backing plate 16.

Figure 8:
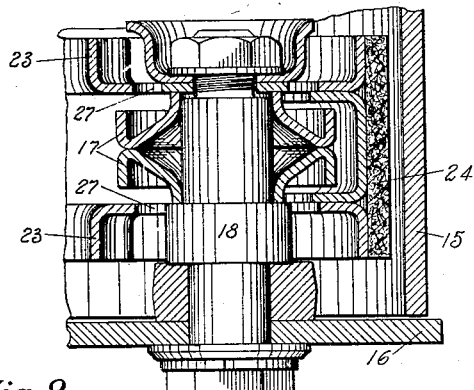
Figure 8 is a section taken on the line 8—8 of Figure 1.
Figure 7:
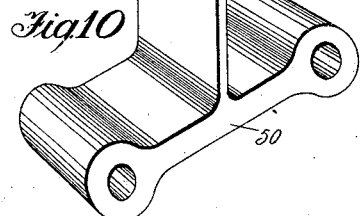
Figure 7 is a section taken on the line 7—7 of Figure 1.
Figure 6:
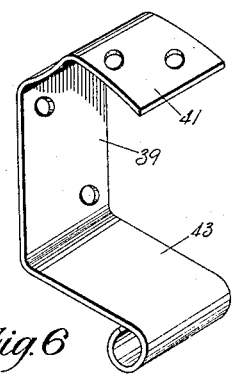
Figure 6 is a perspective view of the resilient spring member for the cam support.
Figure 5:
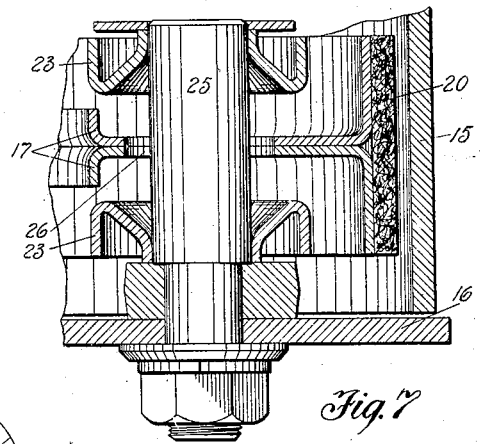
Figure 5 is an enlarged perspective view of the cam shaft support.
Figure 5:
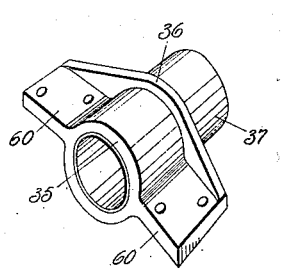

As shown in Figures 1, 7 and 8, the anchored ends of the secondary and reverse shoes 17 and 23 respectively overlap each other, the secondary shoe 17 being provided with an enlarged opening 26 intermediate its ends through which the anchor pin 25 for the reverse shoe 23 extends to allow pivotal movement of the shoe 17 about the pivot pin 18. The reverse shoe 23 is likewise provided with an enlarged opening 27 intermediate its ends through which the anchor pin 18 for the secondary shoe 17 extends to allow pivotal movement of the shoe 23 about its pivot pin 25.

A coil spring 28 which is attached at one end to a pin 29 secured to the backing plate 16 and which is attached at its other end to the free end of the secondary shoe 17 normally holds the shoe out of engagement with the brake drum 15. A second coil spring 30 attached at its ends to the free ends of the primary and reverse shoes 19 and 23 normally holds these shoes out of engagement with the brake drum and draws them inwardly toward each other so that their vertical cam contact faces 31 engage the sides of the operating cam 32 which is about to be described.

The cam 32 is either formed on the end of or is secured to the end of a rotatable shaft 33 which is rotated by a lever 34 suitably connected to a brake pedal or hand lever (not shown). When the cam 32 is rotated by the shaft 33, its ends bear against the contact plates 31 of the brake shoes 19 and 23 to move the same into engagement with the brake drum 15 to thereby retard the rotation of the same.

In conventional constructions the cam shaft 33 is journaled in a fixed bushing and is only free to rotate and no provision is made for uneven wear of the friction facing of the brake shoes. For example, after considerable use, the friction facing 24 of the reverse shoe 23 is worn more than the friction facing 21 of the primary shoe 19 and full benefit of the reverse shoe 23 is not obtained. When the cam 32 is rotated it causes the shoe 19 to engage the drum 15 before the shoe 23 because the facing 24 of the shoe 23 is worn to a greater extent than the facing 19. This, coupled up with the fact that the primary shoe 19 is not very effective when the drum 15 is rotating in a reverse direction, makes a very inefficient brake especially when no benefit is derived from the reverse shoe 23. This is also true when the facing 21 of the primary shoe 19 has worn more than that of the reverse shoe 23. In this case, the full benefit of the primary shoe 19 is not obtained because the construction of the cam 32 necessarily causes the reverse shoe 23 to be engaged with the brake drum 15 before the shoe 19.

It is apparent that a more efficient and more effective brake will be obtained when some means is provided to compensate for wear of the friction facing of the brake elements which allows proportional application of braking pressure, and this invention seeks to accomplish this desired result and overcome the objections just mentioned. The shaft 33 for the cam 32 is preferably journaled in a bracket 35 which has a flange 36 slidably seated against the inner face of the backing plate 16, opposed ribs 60 being formed integral with the flange 36 to serve as guides for and against which the free ends of the primary and reverse shoe slidably rest, and a cylindrical portion 37 extending outwardly through an elongated slot 38 in the backing plate 16.

The bracket 35 is supported by a flexible member comprising a pair of stampings 39 preferably of spring metal secured together by rivets 40, or other suitable means. Each stamping 39 is provided with a portion 41 seated against and secured by rivets 42 to one of the ribs 60 of the bracket 35, a vertical resilient portion and a horizontal portion 43, the end of which is rolled to receive a bolt 44 which secures the same to the backing plate 16.

In order to illustrate the operation of the brake cam support, the friction facing 24 of the reverse shoe 23 will be considered as being worn more than and consequently of less thickness than the facing 21 of the shoe 19, and the drum 15 will be considered as rotating in a clockwise direction as viewed in Figure 1, which in reality is the direction in which the same rotates when the motor vehicle is being backed up. When the brakes are applied in this case the cam 32 is rotated in a counterclock-wise direction by the lever 34 and shaft 33 which causes the brake shoes 19 and 23 to move outwardly. The shoe 19 engages the drum 15 before the shoe 23 because of the difference in thickness of the friction facings, and because the drum 15 is rotating in a clockwise direction against the movement of the shoe 19 very little effective braking is obtained.

This is overcome however, by the fact that the stampings 39 which support the cam shaft journal 35, are of spring metal and flex a sufficient amount to allow the cam 32 to swing to the right in order to move the shoe 23 in engagement with the brake drum 15 so that full braking action and full benefit of the reverse shoe 23 is obtained. The opening 38 in the backing plate 16 through which the cam shaft journal 36 extends is of sufficient length to allow the swinging movement of the cam 32 whereby braking pressure is equalized between the two shoes and wearing of the ends of the friction facings is compensated for. When the braking pressure is released the resilient stampings 39 swing the cam 32 back to the normal position shown in Figure 1 so that when in this normal position the brake shoes are correctly spaced from the drum 15 and are held out of engagement therewith by the coil springs 28 and 30.

Figure 10:
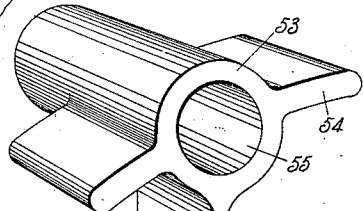
Figure 10 is an enlarged perspective view of the modified form of brake cam support shown in Figure 9.

A modification of the cam support is shown in Figures 10 and 11. The support shown in these figures is forged from a single piece of metal to a T-shape and comprises a horizontal portion 50 which is secured at its end by bolts 51 to the backing plate 16, an integral vertical riser 52 of thin cross section preferably tempered to make the same resilient, and a circular journal 53 formed integral with the upper end of the riser 52 having outwardly projecting ribs 54 and a central opening 55 which receives the shaft 33 of the cam 32. This construction acts in the same manner as the resilient stampings 32 previously described, the only difference being that the same is constructed of a single forging which reduces manufacturing and assembly costs.

It is readily apparent that the present invention has many advantages which are not present in brake constructions used previous to this time. None of the previous constructions have been provided with a support for the brake cam shoe which is swingable to compensate for wearing of the ends of the brake shoes and which is of such a resilient nature that after braking pressure is released, it will return to its normal position independently of the braking element.

Although the present invention is embodied in a three-shoe brake, it is to be understood that no claim is made to the construction of the brake proper other than the operating means therefor. It is also to be understood that this invention is easily adaptable for use with a band brake as well as a pivoted shoe brake, and that formal changes may be made in the specific embodiment of the invention described without departing from the spirit and substance of the broad invention, the scope of which is commensurate with the appended claims.

What I claim is:

1. In a brake mechanism, a rotatable drum, a backing plate adjacent thereto, a brake element engageable with said drum, a rotatable cam between the ends of said brake element for moving the same into engagement with said drum, and a resilient member fixedly mounted on said backing plate supporting said cam to permit the same during rotation thereof to move with an end of said brake element.

2. In a brake mechanism, a rotatable drum, a brake element engageable therewith, a rotatable cam positioned between the ends of said brake element for moving the same into engagement with said drum, a shaft for rotating said cam, a support for said shaft comprising a journal portion and a resilient portion secured to said backing plate for allowing said cam during rotation thereof to move with an end of said brake element.

3. In a brake mechanism, the combination with a rotatable drum, a backing plate adjacent thereto, and braking means engageable with said drum, of a rotatable cam for moving said braking means into engagement with said drum, means for rotating said cam, and resilient means fixedly mounted on said backing plate for supporting said last mentioned means to allow said cam during rotation thereof to move with said braking means, said resilient supporting means being adapted to return said cam to normal position independently of said braking means.

4. In a brake mechanism, the combination with a rotatable drum and a brake element engageable therewith, of a rotatable cam engaging the free ends of said brake element for moving the same into engagement with said drum, a shaft for rotating said cam, a supporting journal for said shaft, and a resilient member fixed at one end and secured at its other end to said journal for allowing said cam to move during rotation thereof with an end of said brake element, said resilient member being adapted to return said cam to normal position independently of said brake element.

5. In a brake mechanism, the combination with a rotatable drum and a brake element engageable therewith, of a backing plate adjacent to the open end of said drum having a slot therein, a rotatable cam positioned between the free ends of said brake element for moving the same into engagement with said drum, a shaft extending through said slot in said backing plate for rotating said cam, a journal surrounding said shaft, and a resilient arm supporting said journal having its free end rigidly secured to said backing plate, said support permitting said cam during rotation thereof to move with an end of said brake element for insuring engagement of said end with said brake drum.

6. In a brake mechanism, the combination with a rotatable drum and a brake element engageable therewith, of a backing plate adjacent to the open end of said drum having a slot therein, a rotatable cam for moving said brake element into engagement with said drum, a shaft extending through said slot in said backing plate for rotating said cam, a journal for said shaft, and a resilient T-shaped support for said journal, the ends of the horizontal portion thereof being secured to said backing plate and the free end of the vertical portion thereof being secured to said journal for allowing swinging movement of said cam to compensate for wear of said brake element.

7. In a brake mechanism, the combination with a rotatable drum and a brake element engageable therewith, of a rotatable cam positioned between the free ends of said brake element for moving the same into engagement with said drum, a shaft for rotating said brake element, a journal for said shaft, and an inverted T-shaped support for said shaft comprising a pair of resilient oppositely disposed stampings secured together having the free ends of the vertical portions thereof secured to said journal, the vertical portions of said support being flexed during rotation of said cam to allow said cam to move with an end of said brake element to compensate for wear of the same.

Signed by me at South Bend, Indiana this 28th day of March 1928.

ROBERT F. KOHR.